United States Patent
Cepynsky

(10) Patent No.: US 9,139,123 B2
(45) Date of Patent: Sep. 22, 2015

(54) RV TRAILER MOTION LOCK-OUT SYSTEM

(71) Applicant: George L. Cepynsky, Lisle, IL (US)

(72) Inventor: George L. Cepynsky, Lisle, IL (US)

(73) Assignee: Precision Circuits Inc., Lisle, IL (US)

( * ) Notice: Subject to any disclaimer, the term of this patent is extended or adjusted under 35 U.S.C. 154(b) by 38 days.

(21) Appl. No.: 14/178,493

(22) Filed: Feb. 12, 2014

(65) Prior Publication Data

US 2015/0224909 A1    Aug. 13, 2015

(51) Int. Cl.
*B60P 3/34*    (2006.01)
*B62D 63/06*   (2006.01)

(52) U.S. Cl.
CPC .............. *B60P 3/34* (2013.01); *B62D 63/061* (2013.01)

(58) Field of Classification Search
CPC .......... B60P 3/34; B62D 63/06; B62D 53/10; B62D 53/00
See application file for complete search history.

(56) References Cited

U.S. PATENT DOCUMENTS

| | | | |
|---|---|---|---|
| 6,213,531 B1* | 4/2001 | Corey et al. ................ | 296/26.09 |
| 6,224,126 B1* | 5/2001 | Martin et al. .............. | 296/26.01 |
| 6,254,171 B1* | 7/2001 | Young, Sr. .................... | 296/165 |
| 6,575,514 B2* | 6/2003 | McManus et al. .......... | 296/26.01 |
| 6,718,235 B1* | 4/2004 | Borugian .......................... | 701/1 |
| 8,141,927 B2* | 3/2012 | Kreil .......................... | 296/26.01 |
| 2002/0070700 A1* | 6/2002 | McManus et al. ............ | 318/700 |
| 2002/0089212 A1* | 7/2002 | Garceau et al. .............. | 296/165 |
| 2005/0184546 A1* | 8/2005 | Kunz et al. ................. | 296/26.01 |
| 2006/0125268 A1* | 6/2006 | Kunz .......................... | 296/26.09 |
| 2009/0261610 A1* | 10/2009 | Kreil .......................... | 296/26.13 |
| 2012/0035813 A1* | 2/2012 | Kreil .............................. | 701/49 |

* cited by examiner

*Primary Examiner* — Kevin Hurley
*Assistant Examiner* — Gabriela C Craciun
(74) *Attorney, Agent, or Firm* — Schiff Hardin LLP

(57) ABSTRACT

An RV trailer motion lock-out system is provided for installation on an RV trailer having a brake light and having at least one protruding component with a corresponding protruding component activation unit for extending said protruding component. A detect circuit detects when voltage is applied to the brake light for illuminating the brake light. A lock-out circuit controls the protruding component activation unit to permit the extending of the protruding component upon user command, and once the brake light is illuminated, the lock-out circuit latches for preventing the extending of the protruding component, the illumination of the brake light being indicative of transit of the RV trailer.

15 Claims, 2 Drawing Sheets

RV TRAILER MOTION LOCK-OUT SYSTEM

BACKGROUND

RV trailers have protruding components which can be extended when the trailers are not in motion and parked for use. For example, a room portion of an RV trailer may be expanded by extension of one sidewall of the room. This is typically known in the industry as a "slide-out room" as shown at 13 in FIG. 1, and which is also shown in the extended position illustrated by dashed lines at 13' in FIG. 1. At a front end of the RV trailer, it is also known to extend another smaller slide-out room, such as shown at 12, and which is also shown in the extended position as illustrated by dashed lines at 12'. Other examples of protruding components are awnings, landing gear, level systems, steps, etc.

In view of danger if components are extended during transit, a standard has been developed by the National Fire Protection Association (NFPA). With respect to protruding component operation the standard states at section 6.4.9: "The operation of protruding components (i.e., awning, landing gear, level system or slide-outs) controlled by means of an electrical switch or controller for operation, shall be incapable of activation while the vehicle is in transit."

The above standard is intended to limit an intentional or unintentional extension activation of the protruding components while the trailer is in motion.

SUMMARY

It is an object to provide a system which will prevent activation of protruding components while the RV trailer is in transmit.

An RV trailer motion lock-out system is provided for installation on an RV trailer having a brake light and having at least one protruding component with a corresponding protruding component activation unit for extending said protruding component. A detect circuit detects when voltage is applied to the brake light for illuminating the brake light. A lock-out circuit controls the protruding component activation unit to permit the extending of the protruding component upon user command, and once the brake light is illuminated, the lock-out circuit latches for preventing the extending of the protruding component, the illumination of the brake light being indicative of transit of the RV trailer.

DESCRIPTION OF THE EXEMPLARY EMBODIMENTS

Figure 1:
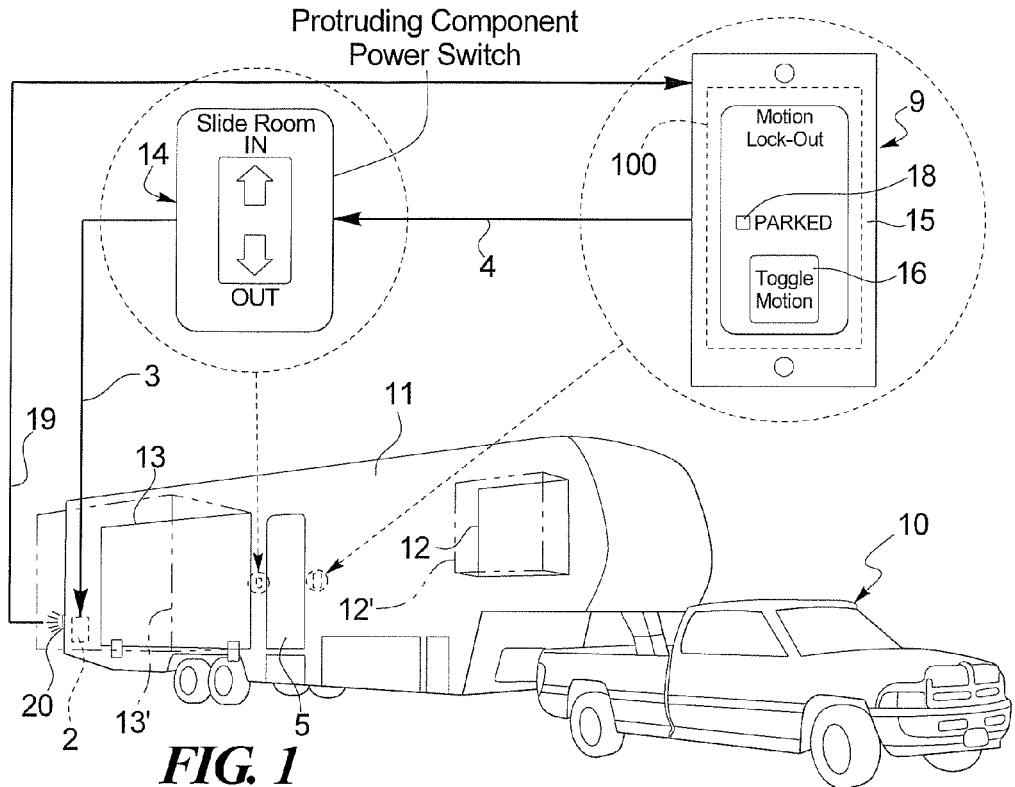
FIG. 1 is a perspective view showing a motion lock-out system of a preferred exemplary embodiment installed on an RV trailer attached to a towing vehicle.

For the purposes of promoting an understanding of the principles of the invention, reference will now be made to the preferred exemplary embodiments/best mode illustrated in the drawings and specific language will be used to describe the same. It will nevertheless be understood that no limitation of the scope of the invention is thereby intended, and such alterations and further modifications in the illustrated embodiments and such further applications of the principles of the invention as illustrated as would normally occur to one skilled in the art to which the invention relates are included herein.

The motion lock-out system 9 of the exemplary embodiment shown in FIG. 1 prevents an activation (extension operation) of protruding components in an RV trailer while the vehicle is in transit. It is useful for protruding components such as slide-out rooms, awnings, landing gear, level systems, steps or other protruding components.

The motion lock-out system 9 is mounted inside the trailer such as on an inside wall for easy owner access, as illustrated in FIG. 1. The system is comprised of a control panel 15 and an enclosure shown in dashed lines at 100 in FIG. 1 rearwardly of the control panel which houses electronic components of the system. Such an enclosure is not necessary, however. Alternatively the component enclosure may be located at a remote location away from the control panel.

As shown in FIG. 1, a tow vehicle 10 is hitched to the RV trailer 11. The RV trailer 11 has protruding components such as the small slide-out room 12 at a front end of the vehicle having a configuration 12 in a non-extended position, and in an extended position as shown in dashed lines at 12'. Similarly a larger slide-out room is shown in a non-extended position 13 or in an extended position 13' as indicated by dashed lines. The slide-out room 13 has a momentary power switch 14 with a middle neutral position for controlling the in and out movement of the slide-out room. This power switch 14 may be located, for example, adjacent an access door 5 of the trailer.

Figure 3:
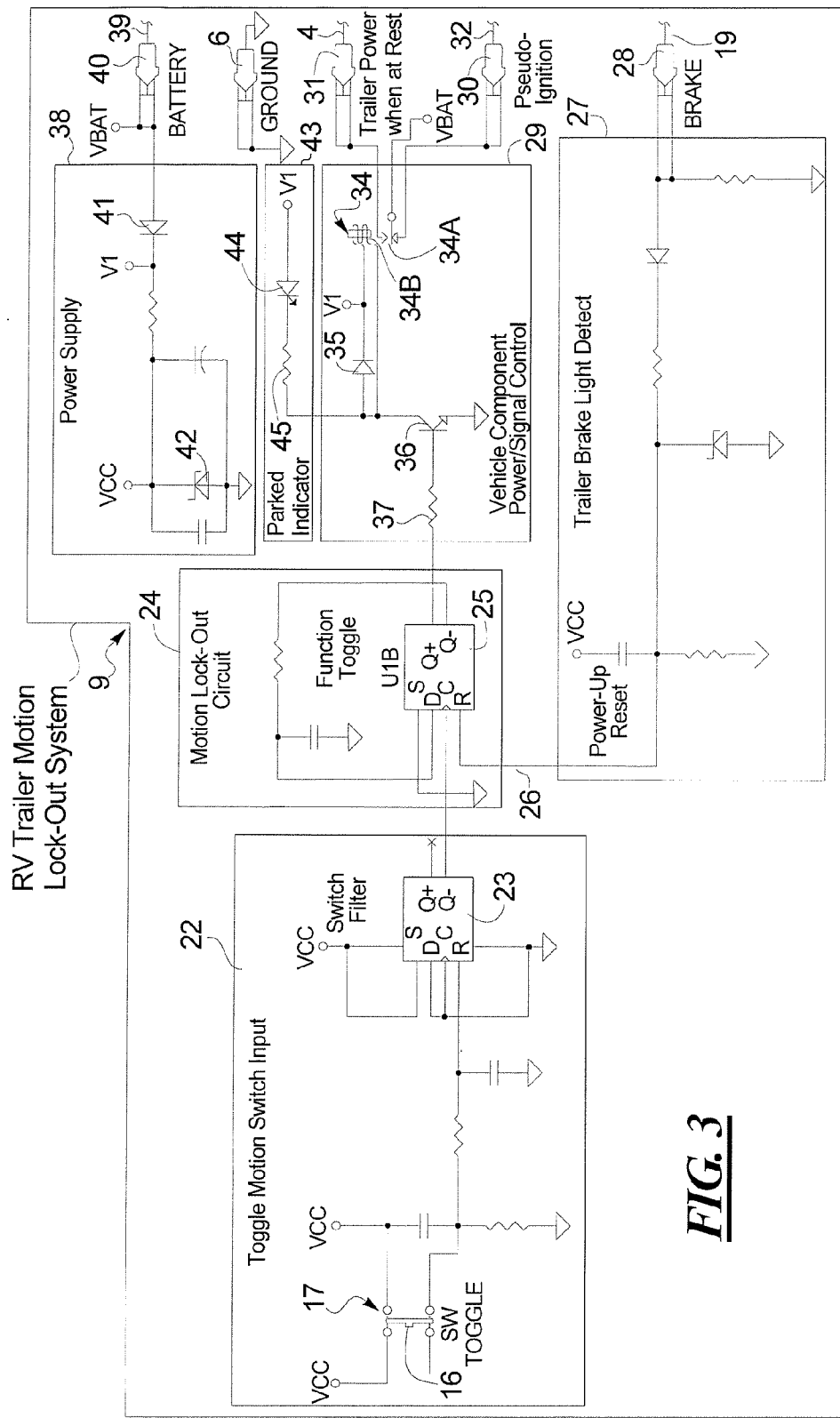
FIG. 3 is a schematic/block diagram of the motion lock-out system installed on the trailer as shown in FIG. 1.

Next to the access door 5 of the trailer opposite the slide-out room switch 14 the control panel 15 of the motion lock-out system 9 is mounted on an inner wall. The panel 15 has a momentary toggle motion button 16 which activates a momentary toggle motion switch 17 (FIG. 3). When a user presses the toggle motion button 16 if the RV trailer is in the non-motion or parked position, all protruding components in the RV trailer may be activated for extension by their respective power switches. A parked indicator light 18 such as an LED 44 shown in FIG. 3 discussed hereafter is lit when the protruding components may be activated to permit extension operation.

The motion lock-out system 9 is connected to an electrical line 19 which provides power to activate a brake light 20 at the rear of the RV trailer 11. As soon as a brake pedal in the tow vehicle 10 is pressed, motion is set and the critical protruding components will not operate while the trailer is in transit. The user can also press the toggle motion button 16 to indicate the RV trailer 11 is in transit or is about to be placed in transit. As shown by the connection line 4 in FIG. 1, the motion lock-out system 9 is linked by electrical line 4 to supply power to the protruding component activation power switch such as the slide room switch 14. Electrical line 19 links system 9 to a brake light 20 and electrical line 3 links the switch 14 to a motor or pneumatic drive 2 shown in dashed lines for extending the slide-out room 13.

Figure 2:
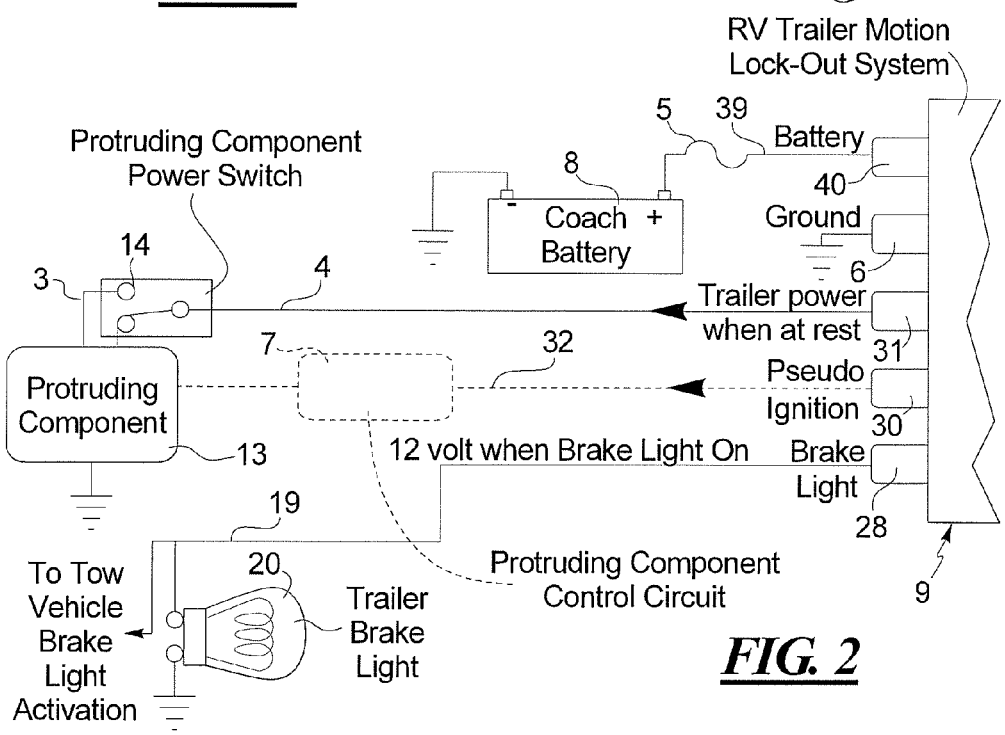
FIG. 2 is a simplified schematic illustration of the motion lock-out system shown in FIG. 1 connected to components external to the system.

FIG. 2 illustrates how the RV trailer motion lock-out system 9 interfaces with the various components external to the system 9 on the trailer 11. A quick connect terminal 28 receives an input signal of 12 volts on the line 19 when the tow vehicle supplies 12 volt power to active the trailer brake light 20. A pseudo ignition quick connect terminal 30 outputs a pseudo ignition signal on line 32 as shown by a dashed line to a protruding component control circuit 7 also shown by a dashed line which in turn outputs power for controlling a protruding component such as the slide-out room 13. The pseudo ignition signal simulates an ignition signal from the tow vehicle. This pseudo ignition signal permits operation of the control circuit 7 when the trailer is at rest.

Alternatively, if the trailer does not have such a control circuit 7 or if it is desired not to use the control circuit, then alternatively a trailer power at rest quick connect terminal 31 outputs on line 4 12 volts power to the protruding component power switch 14, such as the slide-out room switch, which then feeds power to the protruding component, such as the slide-out room 13. This 12 volt power is present when the trailer is at rest. When the trailer is not at rest, then no 12 volt power is available on this line 4 from terminal 31. A battery quick connect terminal 40 is an input line receiving power through a fuse 5 from the coach battery 8. Quick connect terminal 6 connects to ground.

Summarizing, when voltage supplied to the brake light 20 is sensed, the motion lock-out system 9 disables power to the slide-out room switch 14 and prevents the slide-out room 13 from being extended while the RV trailer 11 is in transit.

A more detailed description of the motion lock-out system 9 will now be described with reference to the schematic block diagram shown in FIG. 3. A toggle motion switch input block 22 includes the momentary toggle motion lock-out switch 17 activated by the toggle motion button 16 to feed VCC voltage via an R/C network to reset input R of a D-type flip-flop 23 functioning as a switch filter. Output Q− inputs to a motion lock-out circuit 24 at clock input C of another D-type flip-flop which operates as a function toggle. An RC network feeds back from the Q− output through an RC network to a data input D. Reset input R of function toggle flip-flop 25 receives an output signal on line 26 from a trailer brake light detect block 27. Block 27 connects via the brake quick connect terminal 28 to the brake light 20 via power wire 19 (also see FIG. 2) of the RV trailer 11. The quick connect terminal 28 connects through a diode detection, having an associated Zener and RC network through the output line 26 to provide a brake light detection signal on line 26 to the reset input R of flip-flop 25 of the motion lock-out circuit block 24.

A vehicle component power/signal control block 29 has an input connected to a VBAT terminal connected to battery voltage, a first output connected to the pseudo-ignition quick connect terminal 30, and a second output connected to the quick connect trailer power when at rest terminal 31. The pseudo-ignition terminal 30 connects as shown in FIG. 2 to the pseudo-ignition wire 32 which connects to the control circuit 7 as previously described. The trailer power when at rest quick connect terminal 31 connects to the wire 4 supplying power to the power switch 14.

The battery voltage input and the first and second outputs of the control block 29 connect to three terminals of a switch portion 34A of a relay 34 driven by a relay coil 34B. The relay coil 34B is controlled via a diode 35 from a switching transistor 36 whose input connects through a resistor 37 from the output terminal Q+ of the flip-flop 25 in the motion lock-out circuit block 24.

A parked indicator block 43 has an LED diode 44 as the parked indicator light 18 which connects through a resistor 45 to the collector of transistor 36.

A power supply block 38 connects to a battery wire 39 via the battery quick connect terminal 40 to provide the battery voltage VBAT. The power supply block 38 connects the battery voltage VBAT through a diode 41 and RC network to a Zener diode 42 providing a regulated system voltage VCC for the overall motion lock-out system 9 of FIG. 3.

Functions of the circuit blocks shown in FIG. 3 will now be described.

The toggle motion switch input block 22 functions to clean-up the voltage signal sent from the momentary toggle motion button switch 17 and outputs the cleaned-up voltage signal from the flip-flop 23 as a digital signal. The block 22 thus filters out a debounce signal from the switch 17.

The motion lock-out circuit block 24 receives the input digital signal and performs a function toggle and outputs a digital relay coil drive signal.

The vehicle component power/signal control block 29 receives the relay coil drive signal, amplifies that signal, and drives the relay coil which controls the relay in a first position to switch the battery voltage VBAT to a first contact connected to the quick connect terminal connecting to the wire conveying power to the slide-out room momentary switch 14 or any other switch required to receive power for controlling protruding components of any kind in the RV vehicle. Alternatively, with the relay in an opposite second position, the battery voltage VBAT is fed to the quick connect terminal 30 connecting to a wire 32 providing the pseudo-ignition signal to the previously described protruding component control circuit 7 in FIG. 2.

The trailer brake light detect block 27 has an input connecting to the quick connect terminal 28 connecting to the brake light voltage wire 19 which is then fed through a detection diode network with a Zener and an RC filter to create an output signal for resetting the flip-flop 25 in the motion lock-out circuit block 24.

As an overview of the RV trailer motion lock-out system, when the trailer light illuminates the detect circuit detects that voltage has been applied to the brake light. The lock-out circuit then latches and is thus in a state in which extension of the protruding component is disabled. This disabling is maintained in view of the latching until the toggle switch is actuated so that the lock-out circuit is then switched to a state in which extension of a protruding component is enabled. When the lock-out circuit is latched, further illumination of the brake light does not affect the state of the lock-out circuit until the toggle switch changes the state of the lock-out circuit to again enable extension of the protruding component.

Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

I claim as my invention:

1. An RV trailer motion lock-out system for installation on an RV trailer having a brake light and having at least one protruding component with a corresponding protruding component activation unit for extending said protruding component, comprising:
   a detect circuit for detecting when voltage is applied to said brake light for illuminating the brake light; and
   a lock-out circuit which controls said protruding component activation unit to permit said extending of said protruding component upon user command, and once the brake light is illuminated, the lock-out circuit latches for preventing the extending of said protruding component, said illumination of said brake light being indicative of transit of said RV trailer.

2. The system of claim 1 wherein said motion lock-out system comprises a motion lock-out switch located inside of said RV trailer.

3. The system of claim 2 wherein said motion lock-out switch comprises a momentary toggle switch with an associated activating button.

4. The system of claim 2 wherein said lock-out switch is located on an inside wall of said RV trailer.

5. The system of claim 2 wherein an indicator light is provided adjacent said lock-out switch which is illuminated when said RV trailer is parked and said protruding component activation unit can be activated for extending said protruding component.

6. A system of claim 1 wherein said protruding component activation unit comprises a power switch for feeding power to a power unit for extending said protruding component.

7. The system of claim 1 wherein said protruding component activation unit comprises a protruding component control circuit for activating a power unit for extending said at least one protruding component.

8. The system of claim 2 wherein said lock-out circuit comprises a filter for filtering out a debounce signal caused by said motion lock-out switch.

9. The system of claim 1 wherein said motion lock-out circuit comprises a function toggle flip-flop.

10. The system of claim 1 wherein said protruding component activation unit is either a protruding component power switch or a protruding component control circuit, and said lock-out circuit has a relay for switching a battery voltage to either a motion lock-out line connecting to said power switch or to said protruding component control circuit via a pseudo-ignition line.

11. The system of claim 1 wherein said motion lock-out system comprises a control panel with an associated enclosure for housing electronic components, said control panel with said enclosure for mounting to an inside wall of said RV trailer.

12. The system of claim 1 wherein said at least one protruding component comprises at least one of a slide-out room, an awning, a landing gear, a leveling system, or steps.

13. The system of claim 1 wherein said lock-out circuit comprises a user operated toggle switch for permitting a user to toggle between a first mode in which said protruding component cannot be extended and a second mode wherein said protruding component can be activated to be extended.

14. An RV vehicle motion lock-out system for installation on an RV trailer having a brake light and having at least one protruding component with a corresponding protruding component activation unit for extending said protruding component, comprising:
 a detect circuit for detecting when voltage is applied to said brake light illuminating the brake light;
 a lock-out circuit which controls said protruding component activation unit to permit said extending of said protruding component upon user command, and when the brake light is illuminated, the lock-out circuit latches and changes to a state in which extension of said protruding component is disabled, said illumination of said brake light being indicative of transit of said RV trailer; and
 said lock-out circuit having a toggle switch for toggling between said state in which extension of said protruding component is disabled and another state wherein extension of said protruding component is enabled.

15. The system of claim 14 wherein the lock-out circuit includes an indicator light which is illuminated when the trailer is parked.

\* \* \* \* \*